June 15, 1965
C. T. LOWE
3,189,063
BATTERY WATERING DEVICE
Filed Aug. 7, 1962
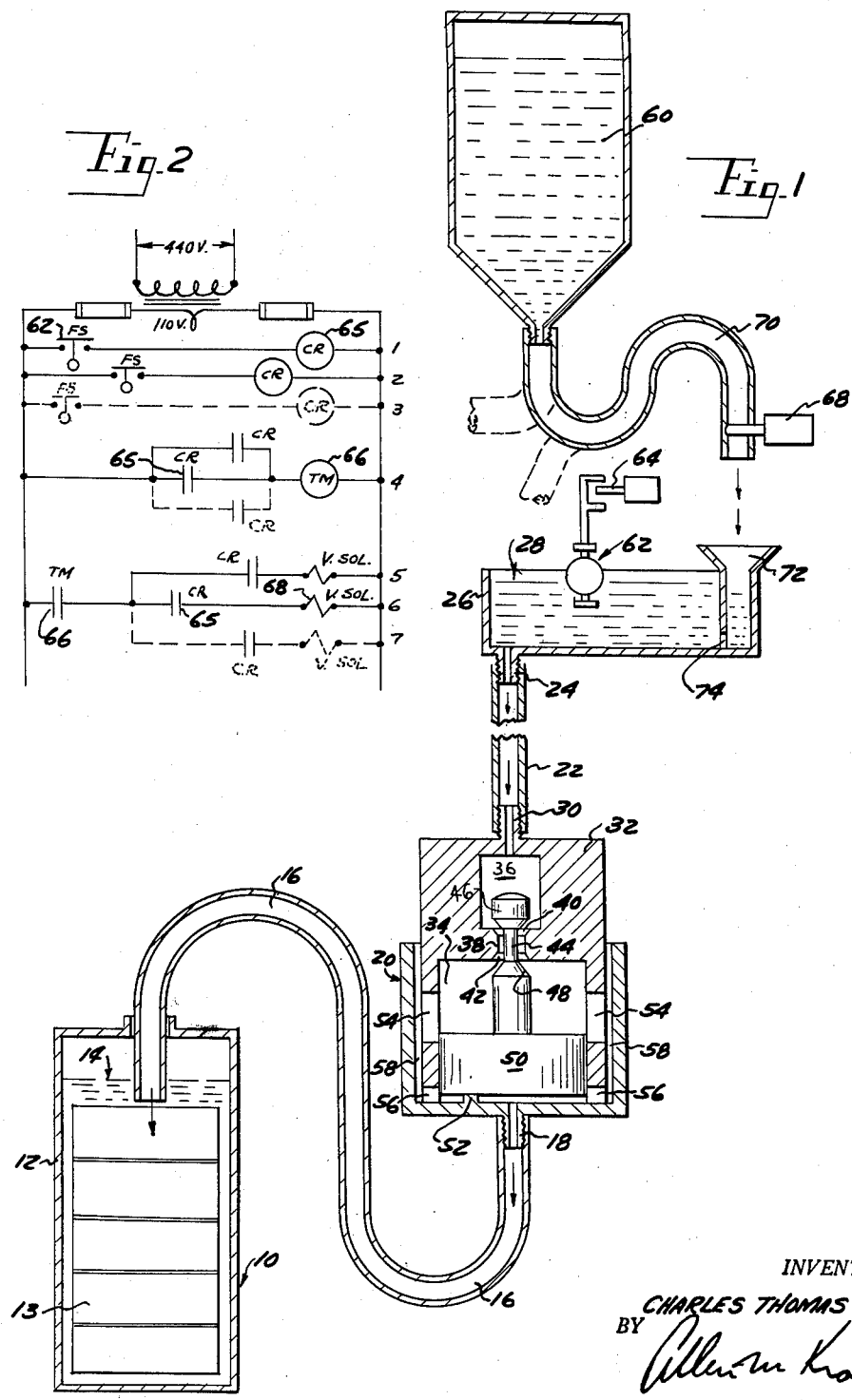
INVENTOR.
CHARLES THOMAS LOWE
BY
ATTORNEYS United States Patent Office 3,189,063
Patented June 15, 1965

3,189,063
BATTERY WATERING DEVICE
Charles Thomas Lowe, 974 Stocker Ave., Flint 3, Mich.
Filed Aug. 7, 1962, Ser. No. 215,409
7 Claims. (Cl. 141—199)

This invention relates to a device for maintaining a fixed level of battery fluid in a battery cell and more particularly has reference to means for automatically and simultaneously filling each of the cells of a multi-celled battery in a single, simple operation.

The conventional battery contains a number of isolated fluidtight cells each having its own body of electrolytic fluid. Due to the chemical reaction constantly taking place within the interior of each cell, the fluid within the cells is continually diminishing. The fluid level in each of the cells lowers at a different rate due to differences in construction from cell to cell. To prevent possible loss of power from the battery, the cells must be replenished with fluid periodically. This is usually accomplished by opening each cell, checking its fluid level, and filling the cell by hand with additional fluid if necessary. This task becomes excessively burdensome when the battery contains an extremely large number of cells.

The present invention contemplates means for automatically restoring the desired level of fluid in every cell in a single operation. This is accomplished by connecting the fluid in each cell to a filling chamber or receptacle in such a manner that the level of fluid in the chamber is a function of the level in the cell. In a preferred embodiment of the invention, a tank of electrolytic fluid usually consisting of distilled water is connected by a hose or pipe to a valve structure which in insertable in the chamber. The valve structure consists of upper and lower passages connected by means of an opening. A valve stem having a diameter less than that of the opening extends through the opening, terminating at its upper end in a section of increased diameter adapted to seal the opening when it is in its lower position. The lower end of the valve stem has a section of increased diameter adapted to seal the opening when it is in its upper position. The lower end of the valve stem is connected to a float designed to float upon the surface of the fluid in the filling chamber.

When the valve structure is placed in the filling chamber, if the fluid in the filling chamber is less than is desired, the valve stem remains in its intermediate or open position. Fluid then flows from the tank through the pipe and the opening down into the filling chamber and into the cell. When the fluid in the chamber reaches the predetermined desired level, the valve stem is in its upper or closed position with the lower enlarged section preventing further flow through the opening. The valve structure is then removed from the filling chamber; gravity pulls the stem into its lower or closed position with the upper enlarged section preventing any passage of fluid through the opening.

In a preferred embodiment of the present invention which will be subsequently described in detail, each valve structure is connected to its own tank. All of the tanks are fed from a single fluid reservoir which supplies the fluid to the tanks in spurts to prevent a short circuit between any of the cells in the battery. This is accomplished by connecting a float switch, which is activated when the fluid level in the tank falls below a desired level, to a timer motor and solenoid valve on an outlet from the reservoir.

The filling chambers are all mounted in a single junction block which is mounted on the case of the battery. The valve structures are similarly mounted in a single junction block. Thus, the device may be operated simultaneously for all the battery cell, simply by placing the block of valve structures in operative position on top of the filling chambers.

This device therefore obviates the requirement of opening each cell to the air and checking its fluid level. By utilizing as many chambers and valve structures as there are cells to be filled, the present device is applicable to a battery having any number of cells.

A further advantage of the present device is its extreme simplicity of both structure and operation, thus assuring reliable performance, a minimum of maintenance, and relatively low cost.

Other objects and advantages of the present invention will be more readily apparent from the following detailed description of a preferred embodiment of the present invention.

The description refers to the drawings in which:

FIGURE 1 is a sectional elevation view of said preferred embodiment;

FIGURE 2 is a schematic illustration of three electrical circuits of a type which will be subsequently described in detail.

Referring to the drawings in detail, a battery cell 10 is shown having an outer casing 12, plates 13, and electrolytic fluid filled to the level at 14. A hose 16 enters the battery through its upper opening and extends down into the battery fluid.

At its other end, the hose 16 is connected to a threaded nozzle 18 extending downward from the lower portion of a cylindrical filling chamber or receptacle 20 situated at approximately the same elevation as the battery. The hose creates a siphon arrangement between these two structures so that the level of fluid in the chamber 20 will always be the same as that in the cell 10.

A second hose 22 is connected to a threaded nozzle 24 on the lower portion of a tank 26 of electrolytic fluid filled to the level shown at 28. The other end of this hose 22 is connected to a threaded nozzle 30 on the upper part of a valve structure 32.

The valve structure, of smaller diameter than the filling chamber 20, defines a large lower passage 34, a smaller upper passage 36, and an opening 38 which connects these two passages. Valve seats 40 and 42 are disposed on opposite sides of this opening. A valve stem 44 extends downward through the opening. At its upper end, the valve stem terminates in a head 46 of increased diameter adapted to seat against the valve seat 40 when the stem 44 is in its extreme lower position. At the lower section of the stem, a shoulder 48 of increased diameter is adapted to seat against the valve seat 42 when the stem is in its extreme upper position.

A float 50 is connected to the lower end of the valve stem 44. When the valve structure 32 is placed in the filling chamber 20, the float is supported by the layer of fluid at the bottom of the chamber. When the fluid level in the chamber decreases to a minimum level, stop 52 fixed to the bottom of the chamber prevents the float from descending any further and allows fluid flowing through the openings 54 and 56 in the side walls of the valve structure 32 and through the air passage 58 between the valve structure and the filling chamber to pass under the float and out through the lower nozzle 18 in the chamber.

The fluid level in the tank 26 is higher than that in the cell 10 and in the filling chamber 20. Thus, when the valve structure 32 is placed in the filling chamber 20 and the valve stem 44 is in open position, flow will begin from the tank through the hose 22 and into the valve structure and filling chamber; flow from the filling chamber to the cell 10 is accomplished by siphon action through the hose 16.

The liquid in the tank 26 is maintained at a constant level by means of a reservoir 60 situated at a higher elevation than the tank which supplies fluid to the tank in spurts when the fluid level in the tank falls to a predetermined level. By supplying the fluid in spurts rather than in a continuous flow, the possibility of a short circuit between the individual cells is avoided. FIGURE 2 illustrates the electrical circuits required to actuate the present device. For simplicity, only three circuits are shown although as many circuits will be utilized as there are cells to be filled. Only two of the circuits are shown in solid lines. A float switch 62 closes a contact 64 when the fluid reaches this predetermined level energizing a relay 65 (FIG. 2, line 1) which in turn activates a timer motor 66 (FIG. 2, line 4). The timer motor intermittently opens and closes a solenoid valve 68 (FIG. 2, line 6) across one of the outlets 70 of the reservoir 60 which is positioned directly above a funnel-shaped inlet 72 in the tank 26. When the solenoid valve 68 is open, fluid falls into the funnel-shaped inlet 72 in the tank and passes into the central section of the tank through an opening 74 in the side of the inlet.

In operation, when the cell 10 is to be filled, the valve structure 32 is placed in the filling chamber 20. The level of fluid in the filling chamber will equal that in the cell due to siphon action between these two structures. If the level of electrolyte in the filling chamber is less than the predetermined desired amount, the float 50 and valve stem 44 are supported either by the fluid or by the stop 52 in such position that the opening 38 is unrestricted and flow begins from the tank 26 into the filling chamber 20 and the cell 10. As the fluid level rises in the cell and the filling chamber, the valve stem 44 rises until it assumes a closed position, the shoulder 48 restricting flow through the opening 38. When flow from the tank 26 has ceased, the valve structure is lifted out of the filling chamber. Gravity holds the valve stem in its lower closed position with the head 46 restricting flow through the opening 38. The valve structure can then be stored without loss of fluid until it is again necessary to fill the battery cell.

To facilitate the filling of a number of cells simultaneously, all of the filling chambers 20 are mounted in a single junction block which is mounted on the casing of the battery. All of the valve structures are similarly mounted in a single junction block. Thus, to operate the device, the valve structures are simply placed on top of the filling chambers and all of the cells are filled at the same time. Each valve structure has its own tank 26 and all the tanks are filled from a single reservoir 60.

Having thus described my invention I claim:

1. A device for supplying electrolytic fluid to a battery cell, comprising:
   a filling chamber communicative with the electrolytic fluid in said cell such as the fluid in said chamber normally maintains a level which is a function of the level in said cell;
   a supply of electrolytic fluid;
   a valve structure continuously communicative with said supply and adapted to be placed within said chamber, said structure having a central passage therethrough;
   a float adapted to float upon the surface of the fluid in said chamber;
   and valve means in said passage connected to said float adapted to restrict the flow of fluid from said supply through said passage to said battery cell when the level of fluid in said chamber is above a predetermined level and to restrict the flow of fluid from said supply through said passage when said valve structure is removed from said chamber.

2. A device for supplying electrolytic fluid to a battery cell comprising:
   a filling chamber communicative with the electrolytic fluid in said cell such that the fluid in said chamber normally maintains a level which is a function of the level in said cell;
   a supply of electrolytic fluid;
   a valve structure continuously communicative with said supply and adapted to be placed within said chamber, said structure having a vertical central passage therethrough;
   a float adapted to float upon the surface of the fluid in said chamber;
   and a valve stem extending vertically through said passage having a diameter smaller than that of said passage, said stem having enlarged ends of larger diameter than said passage exterior of and at opposite ends of said passage, the lower end of said stem being connected to said float whereby an increase of fluid in said chamber above a predetermined level causes said lower enlarged end to restrict the flow of fluid from said supply through said passage and whereby removal of said valve structure from said chamber causes said upper enlarged end to restrict the flow of fluid from said supply through said passage.

3. A device for supplying electrolytic fluid to a battery cell comprising:
   a filling chamber communicative with the electrolytic fluid in said cell such that the fluid in said chamber normally maintains a level which is a function of the level in said cell;
   a supply of electrolytic fluid;
   a valve structure continuously communicative with said supply and adapted to be placed within said chamber, said structure having an upper passage, a lower passage, and an opening between said passages;
   a float adapted to float upon the surface of the fluid in said chamber;
   and a valve stem extending vertically through said opening having a diameter smaller than that of said opening, said stem having enlarged ends of larger diameter than said opening disposed respectively in said upper and lower passages, the lower end of said stem being connected to said float and being adapted to restrict the flow of fluid from said supply through said opening when the level of fluid in said chamber is above a pretermined level, and the upper end of said stem being adapted to restrict the flow of fluid from said supply through said opening when said valve structure is removed from said chamber.

4. The structure defined in claim 1 wherein said supply of electrolytic fluid is comprised of:
   a tank of electrolytic fluid disposed at a higher elevation than the surface of fluid in said chamber and said cell;
   and a reservoir adapted to supply fluid to said tank when the level of fluid in said tank falls below a predetermined level.

5. The structure defined in claim 4 wherein said reservoir allows fluid to fall into said tank intermittently, when the level of fluid in said tank falls below said predetermined level.

6. A device for supplying electrolytic fluid to each of the cells of a battery comprising:
   a cylindrical filling receptacle for each cell, each receptacle having a lower outlet connected in siphon arrangement with the fluid in its corresponding cell such that the fluid surface in said recepetacle normally maintains the same elevation as the fluid surface in said cell, and having a vertical stop projecting upwards from the interior bottom of said receptacle;
   a reservoir of fluid disposed at a higher elevation than the surface of fluid in said filling receptacle and said cell, having outlets equal in number to the number of said cells;
   a tank of fluid for each receptacle disposed at a higher elevation than the surface of fluid in said filling receptacle and said cell, each tank adapted to receive fluid falling from an outlet of said reservoir;
   a cylindrical valve structure for each receptacle having a smaller diameter than the interior of said receptacle and adapted to be placed within said receptacle, having an upper interior passage communicative with the fluid in said tank, a lower interior passage communicative with said upper passage through a vertical opening, valve seats on either side of said opening, and vents adapted to connect to said lower passage with the volume between said valve structure and the interior of said receptacle;

a valve stem extending vertically through said opening having a diameter smaller than that of said opening and having enlarged ends of larger diameter than said opening each disposed within one of said passages and adapted to seal said opening when they abut their adjacent valve seat;

a float connected to the lower end of said stem in said lower passage adapted to float upon the surface of the fluid in said receptacle and having an extreme lower position displaced from the bottom of said receptacle by means of said stop so as to allow said lower outlet to remain unrestricted, whereby a level of fluid in said receptacle below a predetermined level causes said stem to remain in such position that said vertical opening is unrestricted by said enlarged ends, and whereby a level of fluid in said receptacle above said predetermined level causes said lower enlarged end to abut against the adjacent seat so as to restrict flow through said opening;

valve means across each of said reservoir outlets;

a timer motor adapted to open and close said valve means at short intervals;

and a float switch in said tank adapted to actuate said motor when the fluid in said tank is below a predetermined level.

7. A device for supplying electrolytic fluid to a battery cell, comprising:

a filling chamber;

siphon means connecting said chamber and the fluid in said cell;

a supply of electrolytic fluid;

a valve structure continuously communicative with said supply and adapted to be placed within said chamber, said structure having a central passage therethrough;

a float adapted to float upon the surface of the fluid in said chamber;

and valve means in said passage connected to said float adapted to restrict the flow of fluid from said supply through said passage to said battery cell when the level of fluid in said chamber is above a predetermined level and to restrict the flow of fluid from said supply through said passage when said valve structure is removed from said chamber.

References Cited by the Examiner

UNITED STATES PATENTS

| 492,597 | 2/93 | Way | 137—433 XR |
| 1,842,292 | 1/32 | Startakoff | 137—433 XR |
| 2,112,353 | 3/38 | Ward | 137—433 XR |

LAVERNE D. GEIGER, *Primary Examiner.*